United States Patent [19]

Wilkinson

[11] Patent Number: 5,070,403
[45] Date of Patent: Dec. 3, 1991

[54] VIDEO SIGNAL INTERPOLATION

[75] Inventor: James H. Wilkinson, Basingstoke, United Kingdom

[73] Assignee: Sony Corporation, Tokyo, Japan

[21] Appl. No.: 506,809

[22] Filed: Apr. 10, 1990

[30] Foreign Application Priority Data

Apr. 21, 1989 [GB] United Kingdom ............... 8909143
Apr. 21, 1989 [GB] United Kingdom ............... 8909144

[51] Int. Cl.$^5$ .................. H04N 7/12; H04N 7/01; H04N 11/20
[52] U.S. Cl. ............................ 358/136; 358/140; 358/11
[58] Field of Search ............ 358/135, 136, 140, 11, 358/12, 105

[56] References Cited

U.S. PATENT DOCUMENTS

| 4,488,174 | 12/1984 | Mitchell et al. | 358/136 |
| 4,853,775 | 8/1989 | Rouvrais et al. | 358/136 |
| 4,862,266 | 8/1989 | Gillard | 358/140 |

FOREIGN PATENT DOCUMENTS

A2-0095560 12/1983 European Pat. Off. .
A2-0294958 12/1988 European Pat. Off. .
A2-0294959 12/1988 European Pat. Off. .

Primary Examiner—John K. Peng
Attorney, Agent, or Firm—Alvin Sinderbrand; William S. Frommer

[57] ABSTRACT

In an apparatus and method for deriving gradient vectors for use in the spatial interpolation of an input digital video signal; the scan lines of a field of the input digital video signal are high pass filtered so as to provide a high pass filtered video signal which is supplied to a plurality of parallel processing channels in which the high pass filtered video signal is differently low pass filtered so as to form respective low pass filtered video signals, the correlation for a range of pixel offsets is determined pixel-by-pixel for the video signal outputs from the channels so as to form a plurality of gradient vectors for each pixel of the input digital video signal, and the gradient vector is selected, for each pixel of the input digital video signal, which corresponds to the maximum correlation value therefor. The apparatus for deriving gradient vectors is also applicable to a television standards converter.

20 Claims, 7 Drawing Sheets

FIG. 1.
FIG. 2A.
FIG. 2B.
FIG. 2C.

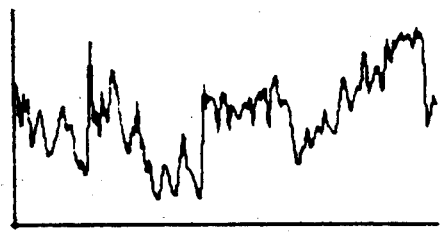
FIG. 3A.  FIG. 3C.
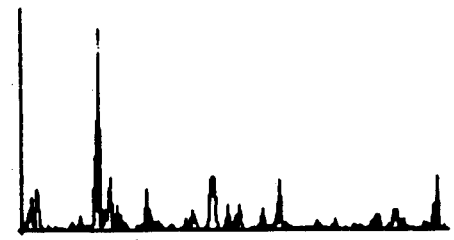
FIG. 3B.  FIG. 3D.
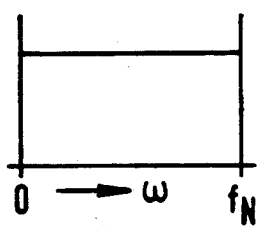 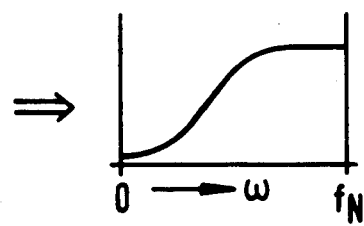 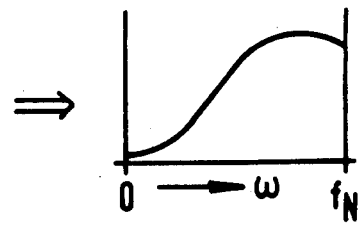
FIG. 4A.
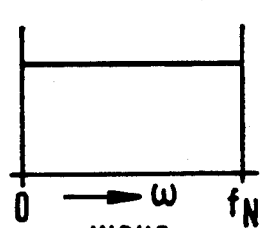 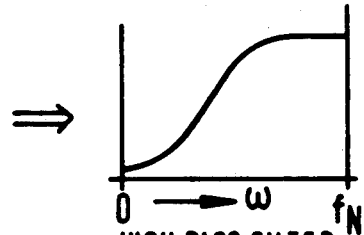 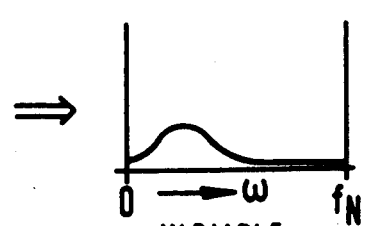
INPUT   HIGH PASS FILTER   VARIABLE LOW PASS FILTER
FIG. 4B.

VIDEO SIGNAL INTERPOLATION

BACKGROUND OF THE INVENTION

1. Field of the Invention

This invention relates to video signal interpolation. More particularly, the invention relates to methods of and apparatus for deriving vectors for use in the interpolation of a video signal, and to interpolators for spatially interpolating a video signal. The invention also relates to interpolator apparatus for interpolating fiels or frames of an input video signal to form interpolated fields or frames, and to motion compensated standards converters.

2. Description of the Prior Art

Requirements exist for converting an interlace scanned video signal into a progressive scan (sometimes called sequentially scanned) video signal, in other words to convert interlace scanned fields of a video signal, each of which consists of the odd or even scan lines only from a frame of the video signal, into progressive scan fields of the video signal each of which consists of a full set of both odd and even scan lines, by a process of spatial interpolation. Examples of where such a requirement arises are where a picture is to be displayed in slow motion, and where it is required to improve the performance of a video display monitor.

The problems inherent in such conversion will be briefly explained with reference to FIG. 1. This shows diagrammatically an overlay of two images of a moving object 1 in two successive fields of an interlace scanned video signal. The portions of the object 1 present in the respective fields are indicated by the bold portions of the scan lines. In this case, neither simple vertical nor temporal interpolation will give a satisfactory result. Thus, vertical interpolation will result in vertical alias, whilst temporal interpolation will result in a double image.

More generally, the primary reason why standard interpolation does not give satisfactory results is that the vertical sampling inherent in the generation of a field of video does not follow classical sampling theory, and results in considerable vertical alias. This problem can be alleviated to some extent by vertical filtering before sampling, but this introduces a significant loss of resolution in normal picture sequences.

It has therefore been proposed to use previous field information where a motion detector indicates low levels of picture movement, or alternatively to use some form of image processing to create the missing lines. The first of these techniques tends to fail with some picture sequences, such as sports scenes, where it is likely that the focus of attention is on a moving object. In such a case it is the movement of the object which is of interest, and hence the information available from the previous field is of no use. The second technique is therefore to be preferred, used either alone or in combination with the first technique, but previously proposed versions of the second technique have been found to be subject to considerable error with some types of picture.

Furthermore, video standards converters are well known devices used to convert video signals from one standard to another, for example, from a 625 lines per frame, 50 fields per second standard to a 525 lines per frame, 60 fields per second standard. Like spatial interpolation, video standards conversion cannot be achieved satisfactorily merely by using simple linear interpolation techniques, because of the temporal and vertical alias which is present in a video signal. Thus, simple linear interpolation produces unwanted artifacts in the resulting picture, in particular, the pictures are blurred vertically and jitter temporally.

To reduce these problems it has been proposed that video standards converters should use adaptive techniques to switch the parameters of a linear interpolator in dependence on the degree of movement in the picture represented by the incoming video signal.

It has also been proposed, for example, for the purpose of data reduction in video signal processing, to generate motion vectors from an incoming video signal by a block matching technique, in which the content of a search block in one field or frame is compared with the respective contents of a plurality of search blocks comprising a search area in the following field or frame, to determine the minimum difference between the contents so compared, and hence the direction and distance of motion (if any) of the content of the original search block.

The present invention is therefore also concerned with the extension of the above-mentioned methods and apparatus to motion compensated interpolation of fields or frames, and to motion compensated standards converters.

SUMMARY OF THE INVENTION

One object of the present invention is to provide a method of deriving gradient vectors.

Another object of the present invention is to provide apparatus for deriving gradient vectors.

A further object of the present invention is to provide interpolator apparatus using gradient vectors.

A still further object of the present invention is to provide an improved television standards converter.

According to as aspect of the present invention there is provided a method of deriving gradient vectors for use in the spatial interpolation of an input digital video signal, the method comprising the steps of:

high pass filtering the scan lines of an input field of said video signal;

low pass filtering the high pass filtered video signal in a plurality of channels containing respective low pass filters;

horizontally interpolating the scan lines of said input field of said video signal in at least some of said channels;

calculating pixel by pixel of the low pass filtered video signal the correlation for a range of pixel offsets; and selecting for each pixel of said video signal the gradient vector corresponding to the said correlation which is of maximum value.

According to another aspect of the present invention there is also provided apparatus for deriving gradient vectors for use in the spatial interpolation of a digital video signal, the apparatus comprising:

a high pass filter for filtering the scan lines of an input field of said video signal;

a plurality of parallel processing channels including respective low pass filters for filtering the high pass filtered video signal;

interpolator means for horizontally interpolating the scan lines of said input field of said video signal in at least some of said channels;

means for calculating pixel by pixel of the low pass filtered video signal the correlation for a range of pixel offsets; and means for selecting for each pixel of said video signal the gradient vector corresponding to the said correlation which is of maximum value.

According to still another aspect of the present invention there is provided an interpolator apparatus for spatially interpolating fields of an interlace scanned video signal to form interpolated scan lines of said video signal, the interpolator apparatus comprising:

a high pass filter for filtering the scan lines of an input field of said video signal;

a plurality of parallel processing channels including respective low pass filters for filtering the high pass filtered video signal;

horizontal interpolator means for horizontally interpolating at least some of the existing scan lines of said input field of said video signal;

means for calculating pixel by pixel of the low pass filtered video signal the correlation for a range of pixel offsets;

means for selecting for each pixel of said video signal the gradient vector corresponding to the correlation which is of maximum value; and a spatial interpolator for deriving sample values for creating interpolated scan lines of said input field by combining sample values from the existing scan lines of said input field offset by said selected gradient vectors.

According to a further aspect of the present invention there is provided an interpolator apparatus comprising: as above, in combination with:

field store means for storing a field of the interlace scanned video signal and supplying a previous field;

motion detector means to determine the local degree of motion in the picture represented by said input field of said video signal on the basis of the input field and the previous field; and selector means controlled by said motion detector means for supplying as the output of the interpolator apparatus the output of said spatial interpolator when said degree of motion is at or above a predetermined threshold, and for supplying as the output of the spatial interpolator data from the field preceding said input field of said video signal when said degree of motion is below said predetermined threshold.

According to a still further aspect of the present invention there is provided an interpolator apparatus for interpolating fields or frames of an input video signal to form interpolated fields or frames of said video signal, such the interpolator apparatus comprising:

a sptial high pass filter for filtering the fields or frames of said input video signal horizontally and vertically;

a plurality of parallel processing channels including respective spatial low pass filters for filtering the high pass filtered video signal horizontally and vertically;

means for horizontally and vertically interpolating the scan lines of the fields or frames of said video signal;

means for calculating pixel by pixel of the spatial low pass filtered video signal the correlation for a range of horizontal and vertical pixel offsets;

means for selecting for each pixel of said video signal the directional gradient vector corresponding to the said correlation which is of maximum value; and temporal interpolator means for deriving interpolated fields or frames by combining existing sample values which are offset by said directional gradient vectors.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 shows diagrammatically the movement of an object between two successive fields;

FIGS. 2A to 2C show diagrammatically spatial interpolation;

FIGS. 3A to 3D show diagrammatically the effect of high pass filtering on correlation;

FIGS. 4A and 4B show diagrammatically the effect of low pass filtering on gradient vectors;

DESCRIPTION OF THE PREFERRED EMBODIMENTS

Figure 5A:
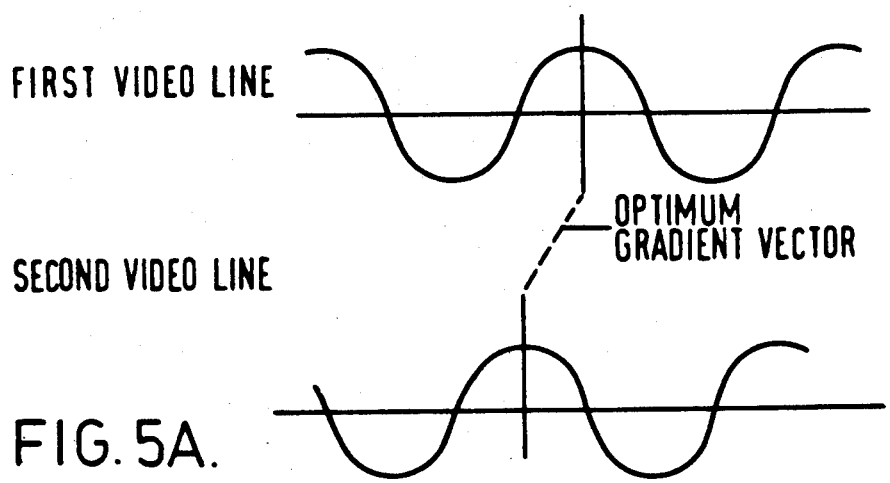
FIGS. 5A and 5B show diagrammatically the relationship between correlation and phase shift.

The invention will be first be described as applied to the derivation of vectors for use in an interpolator for spatially interpolating an interlace scanned video signal to form a progressive scan video signal for use, for example, in a slow motion processor.

The principle of operation of such a spatial interpolator will first be described with reference to FIGS. 2A to 2C. FIG. 2A shows sequences of successive pixels in three successive scan lines of a frame of a digital video signal. The top and bottom scan lines belong to field 0 and the centre line belongs to field 1. The black and open pixels correspond to black and white sample values respectively. A black edge or object is therefore shown extending diagonally from left to right. FIG. 2B shows the field 0 scan lines as before, but in this case the centre scan line has been vertically interpolated by averaging the vertically aligned sample values in the field 0 scan lines above and below. This results in six grey sample values shown hatched. Comparison of FIGS. 2A and 2B shows that this simple interpolation technique gives a completely wrong result. FIG. 2C shows the correct result, which would have been obtained if instead of averaging the vertically aligned sample values, the sample values aligned in the direction of the arrowed line had been averaged. Hereinafter this direction will be called the gradient vector, and the way in which such gradient vectors can be derived will next be described.

Basically the generation of the required gradient vectors involves five steps. Firstly, each scan line of an input digital video signal is high pass filtered. Secondly, a plurality of parallel processing channels are created, with respective different levels of low pass filtering therein. Thirdly, the low pass filtered video signal in at least some of the channels is horizontally interpolated. Fourthly, a windowed correlation is performed, pixel by pixel, for each channel. Fifthly, a gradient vector corresponding to correlation having the maximum value is selected. These steps will now be described in more detail.

The purpose of the high pass filtering is to allow better correlation of fine detail in areas of high luminance magnitudes, and to provide weighting against the selection of large gradient vectors, that is gradient vectors corresponding to a large offset from scan line to scan line. High pass filtering also serves to prevent low frequency direct current components from each channel being presented to the windowed correlation computation. As described below, windowed correlation uses the sum of a group of signal products, and in consequence works best on signals of small magnitude. However, in practice, fine detail may often be superimposed on a high luminance background, and such detail is then difficult to detect. The use of high pass filtering means that small signal edges can more easily be detected irrespective of the mean luminance level. The interpolator can, of course, interpolate only the luminance component of the scanned video signal. This will be more readily understood by reference to FIGS. 3A to 3D, in which FIG. 3A shows part of an input scan line as an amplitude plot. FIG. 3B shows a correlation plot of the same line, and it will be noted that the edges are not very easily distinguishable. FIG. 3C shows the same line after high pass filtering, and FIG. 3D shows a correlation plot of the high pass filtered line. It will be seen from FIG. 3D that the edges are now clearly distinguishable as maxima. In other words, the high pass filtering makes the correlation easier.

Moreover, large gradient vectors are associated with lower cut-off low pass filters, as will now be described with reference to FIGS. 4A and 4B, which are plots of the amplitude of a video signal at frequencies up to the Nyquist frequency $f_N$. FIG. 4A shows the effect on a small gradient vector, and FIG. 4B shows the effect on a large gradient vector. On the left is shown the input bandwidth, in the centre the bandwidth after similar high pass filtering of both signals, and on the right the bandwidth after variable low pass filtering. It will be seen that the low pass filtering makes it more difficult for a large gradient vector to achieve a large correlation value, so some weighting is applied at the stage of high pass filtering. For example, a five-tap finite impulse response filter with taps at $(-1, -4, 10, -4, -1)$ may be used for the high pass filter.

Figure 5B:
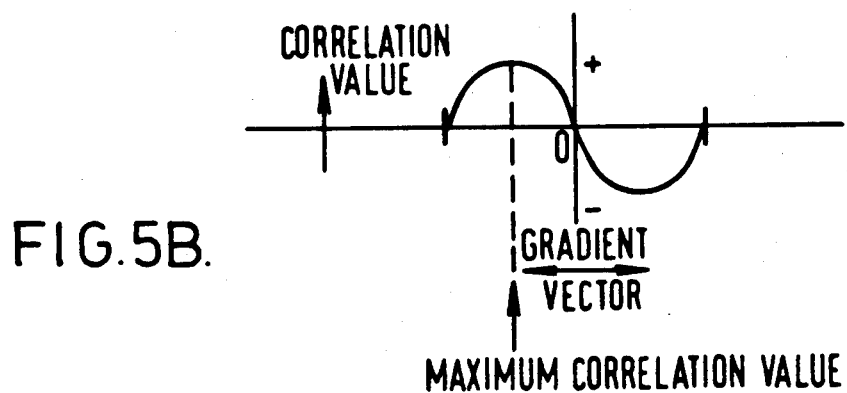

A separate low pass filter is preferred for each gradient vector magnitude in order to limit the maximum phase shift between scan lines to $\pm$pi. Thus, consider an image of a closely spaced grating. As shown in FIG. 5A, with no low pass filtering, there will be multiple correlations, that is correlations additional to that corresponding to the optimum gradient vector indicated. However, at any given frequency only the phase shifts in the range $-$pi/2 to $+$pi/2 are in fact valid, so the method should always try to choose the maximum gradient vector value with the minimum phase shift. Thus, permitting the selection of a gradient vector value outside this range leads to a high probability of seriously incorrect gradient vectors. Interpolation errors of pi could then occur, resulting in a phase inverted signal. Therefore a plurality of parallel processing paths are created for respective gradient vector values, and each path comprises a low pass filter to restrict the phase shift range to $-$pi/2 to $+$pi/2. This leads to a correlation characteristic against phase shift as shown in FIG. 5B.

It should be added that a plurality of channels with respective low pass filters involves a substantial amount of hardware. Thus, for example, a low pass filter corresponding to a gradient vector indicating a pixel offset of magnitude fifteen could require a filter with 255 taps. To reduce this hardware requirement, the number of channels and consequentially the number of low pass filters can be reduced by grouping some of the higher valued gradient vector values in the same low pass filter channels.

Figure 6A:
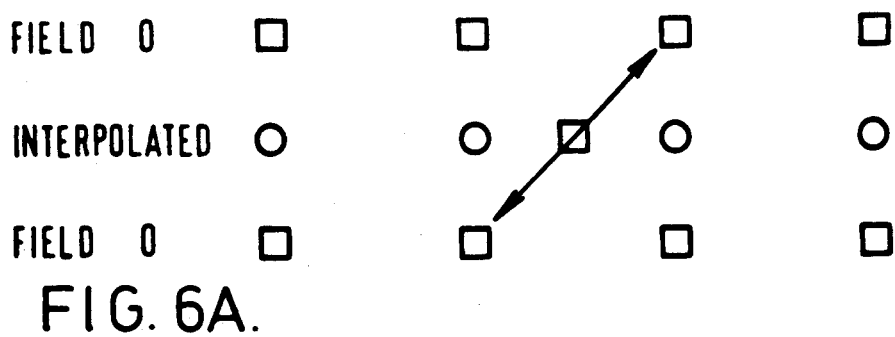
FIGS. 6A and 6B show diagrammatically horizontal and spatial interpolation.
Figure 6B:
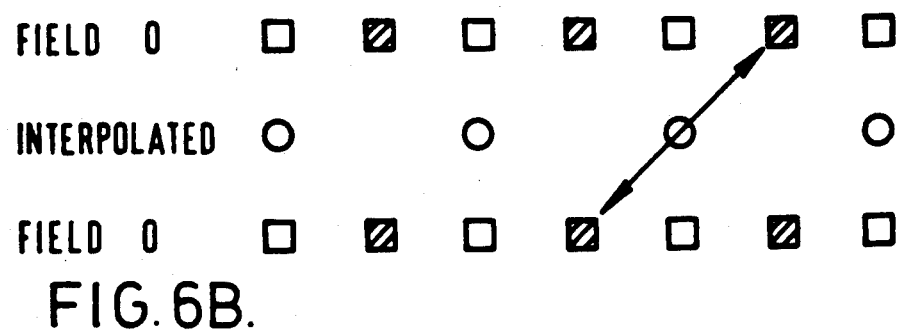

Horizontal interpolation avoids the problems, sometimes referred to as sub-pixel-interpolation, which, in the case of equi-spaced interpolated scan lines, become evident at above half the Nyquist frequency. FIG. 6A shows at the top and bottom the successive pixel positions in two successive scan lines from the same field 0 of a video signal. In the centre are the required pixel positions of an interpolated scan line. If a pixel were now required to be spatially interpolated using the gradient vector indicated, then the pixel position in the interpolated scan line would be as indicated by the square; which is incorrect. FIG. 6B shows the same situation, but in this case the original scan lines have been 2:1 horizontally interpolated prior to the spatial interpolation, and it will be seen that in this case the interpolated pixel falls into a correct position. Integrated circuits for performing such horizontal interpolation by averaging of adjacent sample values are available, and this is a known signal processing procedure. Where the spatial interpolation is not equi-spaced, that is to say where one or more scan lines are to be interpolated at positions not mid-way between the existing scan lines, then appropriate horizontal off-sets are required for each scan line in order to achieve the correct position on the interpolated scan line or scan lines. That is, sample values are interpolated into the existing scan lines at positions phased in dependence on the off-set positions and the predetermined possible values of the gradient vectors.

The correlation step comes next. It should be noted that correlation calculations result in an optimum which is the highest value found, whereas block-matching techniques which have been proposed elsewhere for deriving motion vectors indicating movement between fields or frames of a video signal, result in an optimum with the lowest value. The correlation of two signals, is the sum of the pixel by pixel products of the two signals, and the method used involves a sliding window technique, that is a movable linear window of pixels aligned with the scan lines.

Figure 7:
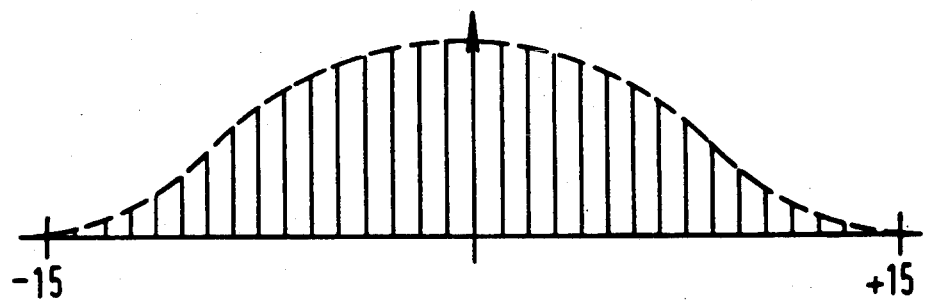
FIG. 7 shows diagrammatically a correlation window.

As indicated in FIG. 7, a correlation value for each pixel in an interpolated scan line is calculated as the sum of the weighted products of the sample values of scan lines above and below the interpolated scan line corresponding to the pixels set at plus and minus the offset corresponding to the gradient vector up to maximum of (say) plus and minus 15 half-pixels. The use of a window applies some low pass filtering to remove undesirable correlation products, and the window coefficients are preferably selected to decrease with distance from the centre of the window as shown in FIG. 7, as this provides a better low pass response than a rectangular window. The optimum then corresponds to the maximum correlation value as measured at the output of the window process. In the event that two or more correlation values are equal, then the gradient vector with the smaller or smallest magnitude is chosen.

Figure 8:
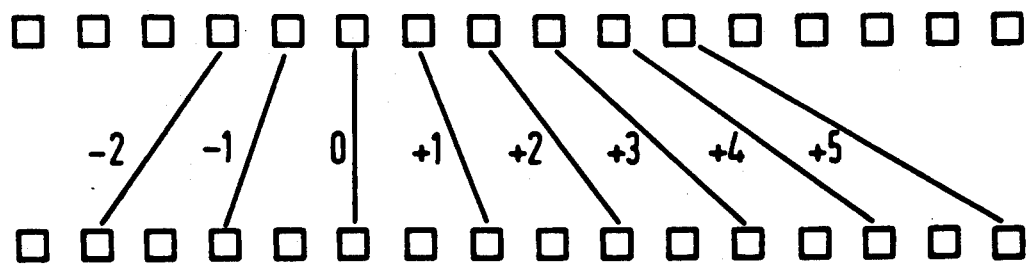
FIG. 8 shows diagrammatically a series of gradient vectors.

FIG. 8 illustrates gradient vectors of magnitude $-2$, $-1, 0, +1, +2, +3, +4, +5$, the numbers corresponding to the (pre-horizontal-interpolation) pixel distances from one scan line in the incoming field to the following scan line in that field. Some limit needs to be placed on the maximum gradient vector value, and the maximum range can be maintained large, whilst restricting the number of different gradient vector values to say sixteen, by omitting some of the higher values which represent similar shallow angles.

An embodiment of apparatus for deriving gradient vectors by the method described above for use in the spatial interpolation of a video signal is shown in block diagrammatic form in FIG. 9, and will now be described. The apparatus comprises a high pass filter 10, the output of which is connected to a plurality of parallel processing channels, numbering sixteen in this particular embodiment, although the number is not critical. Fifteen of the channels comprise respective different low pass filters $11_1$ to $11_{15}$, and each of the channels, including the one not having a low pass filter, includes a respective compensating delay $12_0$ to $12_{15}$, to compensate for the processing delays in the respective channels. In the channels corresponding to the odd numbered gradient vectors, the output of the respective delay $12_1$, $12_3, \ldots 12_{15}$ is connected to a respective horizontal 2:1 or half sample interpolator $13_1, 13_3, \ldots 13_{15}$, that is an interpolator which creates an interpolated sample value mid-way between the existing sample values in the scan line using a known signal processing procedure.

In the first channel, the output of the delay $12_0$ is supplied directly and by way of a 1H (one horizontal scan line) delay $14_0$ to a multiplier $15_0$ and thence to a correlation filter $16_0$. In the second channel, the output of the interpolator $13_1$ is supplied by way of pixel delay $17_{11}$ to a multiplier $15_{11}$, and also directly to a multiplier $15_{12}$. The output of the interpolator $13_1$ is also supplied by way of a 1H delay $14_1$ to the multiplier $15_{11}$, and additionally by way of a pixel delay $17_{12}$ to the multiplier $15_{12}$. The outputs of the multipliers $15_{11}$ and $15_{12}$ are supplied to correlation filters $16_{11}$ and $16_{12}$ respectively. The remaining channels are similar to the second channel, except that the pixel delays $17_{21}, 17_{22}, \ldots 17_{151}, 17_{152}$ increase by one pixel from channel and, of course, the channels corresponding to the even-numbered gradient vectors do not include half sample interpolators to channel up to the sixteenth channel. The outputs of all the correlation filters $16_0$ to $16_{152}$ are supplied to a maximum vector selector 18, which supplies an output indicating which of its correlation inputs is at a maximum, and hence which gradient vector within the range $-15$ to $+15$ pixels is to be selected as corresponding to a maximum correlation value.

Figure 9:
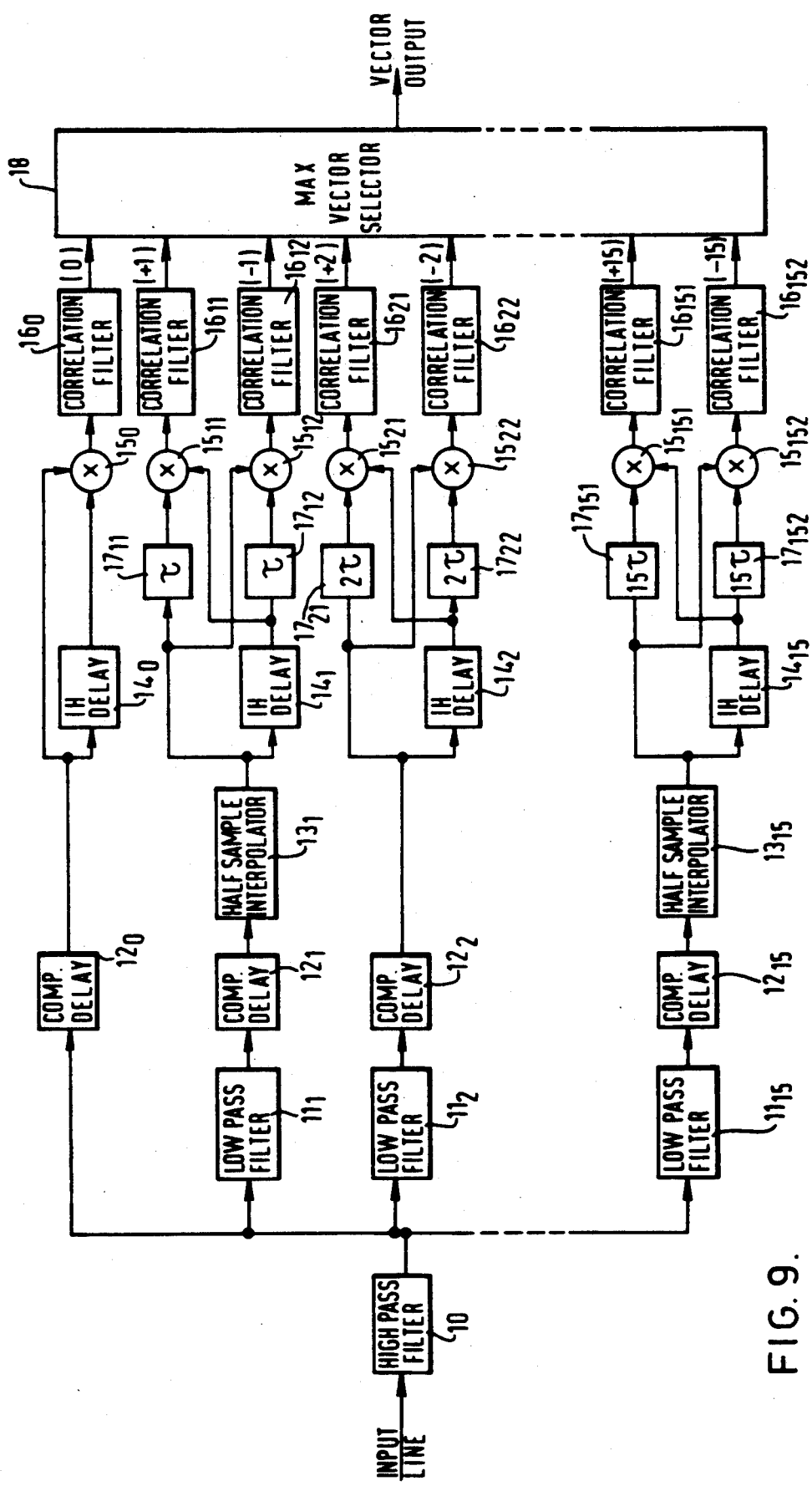
FIG. 9 shows in block diagrammatic form an embodiment of apparatus according to the present invention for deriving gradient vectors.

An embodiment of a spatial interpolator for spatially interpolating a video signal using gradient vectors derived as described with reference to FIG. 9 is shown in block diagrammatic form in FIG. 10. The spatial interpolation of FIG. 10 comprises a vector control circuit 20, variable delays 21 and 22, interpolators 23 and 24, selectors 25 and 26, and an adder and divider circuit 27, interconnected as shown and operating as will now be described.

First and second input scan lines are supplied to the delays 21 and 22, respectively. Each of the delays 21 and 22 is variable and conveniently is in the form of a first-in-first-out circuit, the delay 21 providing a delay of $T+V$, and the delay 22 providing a delay $T-V$. The vector control circuit receives input vector values and in dependence thereon supplies controls signals to the delays 21 and 22, and to the selectors 25 and 26. This particular spatial interpolator arrangement is intended to convert an interlace scanned field into a progressive scan field, and the interpolators 23 and 24 are therefore in this case half-sample interpolators which interpolate sample values in the scan lines by averaging between adjacent existing sample values using a known signal processing procedure. This half-sample interpolation is selected only for odd numbered gradient vectors, under control of the control signals supplied from the vector control circuit to the selectors 25 and 26. The output of the selector 25 is therefore the first scan line shifted by plus the gradient vector and the output of the selector 26 is the second scan line shifted by minus the gradient vector, and these two inputs are averaged by the adder and divider 27 to form the output interpolated line pixel by pixel.

As mentioned in the opening part of the specification, there are circumstances where it is preferred to use previous field information when a motion detector indicates low levels of picture movement, and some form of image processing to create the interpolated scan lines when there are higher levels of picture movement. Such an arrangement incorporating an interpolator as described above with reference to FIGS. 9 and 10, will now be described with reference to FIG. 11.

The apparatus of FIG. 11 comprises a field store 30, a subtracter 31, a spatial vector interpolator 32 (as described above with reference to FIGS. 9 and 10), a motion detection window function circuit 33, a threshold logic circuit 34, and a cross-fader 35 interconnected as shown and operating as will now be described. The input video signal is supplied to the field store 30, to the interpolator 32, and to the subtractor 31. The output of the interpolator 32 is supplied to the cross-fader circuit 35, together with the output of the field store 30, which is also supplied to the subtracter 31, the output of which is supplied to the motion detection window function circuit 33 and thence by way of the threshold logic circuit 34 to form a cross-fade control signal supplied to the cross-fader 35. The field store 30 and the subtracter 31 together provide a signal indicating the degree of movement, and the motion detection window function circuit 33 and the threshold logic circuit 34 together develop, in dependence on this movement a cross-fade control signal which is supplied to the cross-fader 35. Thus, in the event of a small degree of movement, the cross-fader 35 supplies the output of the field store 30 to the output, whilst where there is a larger degree of movement, the cross-fader 35 supplies the output of the interpolator 32 to the output. As an alternative, the cross-fader circuit 35 may be replaced by a switch.

Figure 10:
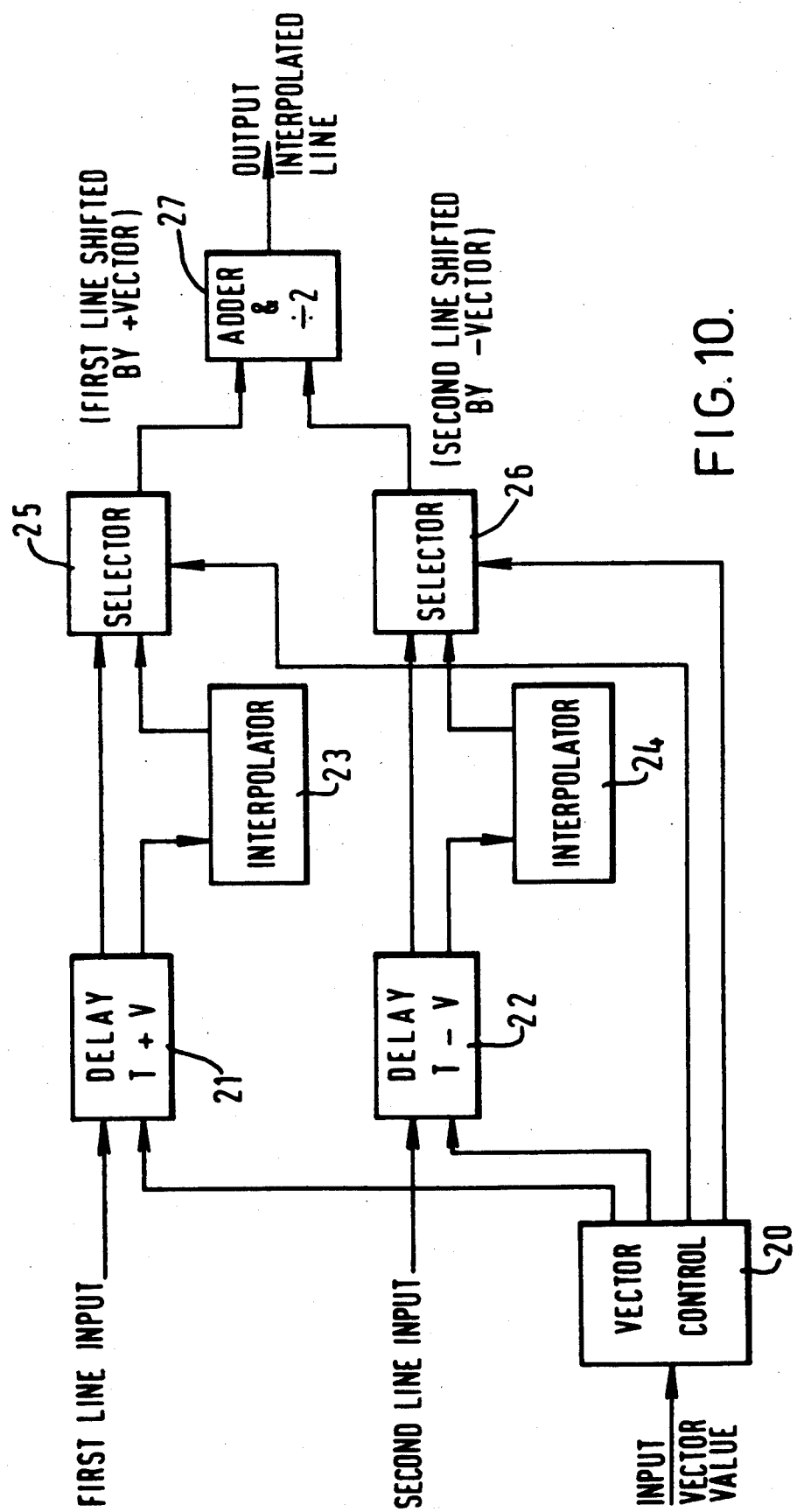
FIG. 10 shows in block diagrammatic form an embodiment of interpolator arrangement according to the present invention.
Figure 11:
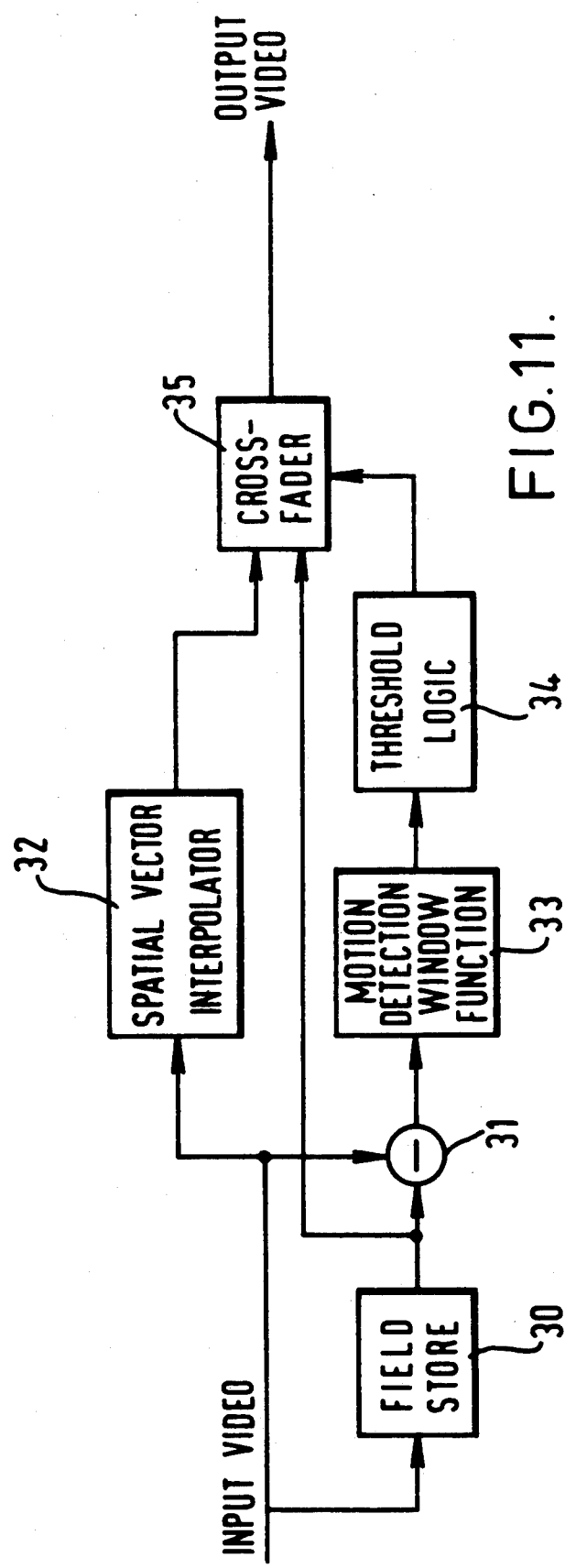
FIG. 11 shows in block diagrammatic form an embodiment of interpolator apparatus according to the present invention.

To adapt the interpolator of FIGS. 9 and 10 to permit interpolation of fields or frames in a video signal, for example in a television standards converter, the following changes are made. Firstly, the horizontal and vertical sample values must be sufficiently interpolated, that is to say the number of samples per scan line and the number of scan lines must be sufficiently increased to allow correct sub-pixel interpolation. Both the high pass filter 10 and all the low pass filters $11_1, 11_2 \ldots 11_{15}$ are modified to become spatial filters operating in two dimensions, that is the horizontal and vertical dimensions, and likewise the correlation window is also applied in the horizontal and vertical dimensions. There are thus produced directional gradient vectors which can be used to interpolate the required sample values to create the required interpolated fields or frames.

As a preliminary to this interpolation of fields or frames, the fields of the input video signal may first be interpolated as described above with reference to FIGS. 9 and 10 or FIG. 11, so that the next stage of interpolation is applied to a progressive scan input video signal.

Thus a television standards converter can be formed for conversion from one television standard to another, or for conversion from video signal to photographic film, or for conversion from photographic film to video signal.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of deriving gradient vectors for use in the spatial interpolation of an input digital video signal which represents fields of pixels arranged in horizontal scan lines, said method comprising the steps of:
   high pass filtering the scan lines of a field of said input digital video signal so as to provide a high pass filtered video signal;
   supplying said high pass filtered video signal to a plurality of channels and, in at least some of said channels, differently low pass filtering the high pass filtered video so as to form respective low pass filtered video signals;
   determining pixel by pixel of the video signal output from each of said channels the correlation for a range of pixel offsets, thereby forming a plurality of gradient vectors for each pixel of said input digital video signal; and
   selecting for each pixel of said input digital video signal the one of said gradient vectors corresponding to the correlation which is of maximum value.

2. A method according to claim 1; wherein said range of pixel offsets used in determining the correlation for each pixel is a window of aligned pixels centered on the respective pixel.

3. A method according to claim 2; wherein said window defines weighting coefficients which decrease with distance from said center pixel, and wherein the pixel values considered in determining said correlation value for each of said gradient vectors are multiplied by respective ones of said weighting coefficients.

4. A method according to claim 1; wherein said high pass filtering provides a low weighting function for gradient vector values of large magnitude.

5. A method according to claim 1; wherein luminance sample values are used as the values for said pixels of said input digital video signal.

6. Apparatus for deriving gradient vectors for use in the spatial interpolation of an input digital video signal which represents fields of pixels arranged in horizontal scan lines, said apparatus comprising:
   high pass filtering means for filtering the scan lines of a field of said input digital video signal, thereby forming a high pass filtered video signal;
   means defining a plurality of parallel processing channels at least some of which include respective low pass filtering means for filtering said high pass filtered video signal, thereby forming a plurality of low pass filtered video signals;
   horizontal interpolator means for horizontally interpolating the pixels of the scan lines of said field of said input digital video signal in at least some of said channels;
   correlating means for performing a pixel by pixel correlation of the video signal outputs from said channels for a range of pixel offsets, thereby forming a plurality of gradient vectors for each pixel of said input digital video signal; and
   means for selecting, for each pixel of said input digital video signal, the one of said gradient vectors corresponding to the correlation which is of maximum value.

7. Apparatus according to claim 6; wherein said range of pixel offsets used in the correlation for each pixel is defined by a window of aligned pixels centered on the respective pixel.

8. Apparatus according to claim 7; further comprising means for multiplying each of the offset pixels by a weighting coefficient which decreases in value with its distance from the center pixel in said window.

9. Apparatus according to claim 6; wherein said high pass filtering means provides a low weighting function for gradient vectors of large magnitude.

10. Apparatus according to claim 6; wherein luminance sample values constitute the values of said pixels of said input digital video signal.

11. An interpolator apparatus for spatially interpolating a field of an interlace scanned input digital video signal which represents pixels arranged in scan lines, so as to form interpolated scan lines for said video signal, said interpolator apparatus comprising:
   high pass filtering means for filtering the scan lines of an input field of said input digital video signal and forming a high pass filtered video signal;
   means defining a plurality of parallel processing channels receiving said high pass filtered video signal and including respective low pass filters for filtering the high pass filtered video signal and thereby forming respective low pass filtered video signals;
   horizontal interpolator means for horizontally interpolating the pixels of at least some of the existing scan lines of said field of said input digital video signal;
   means for calculating pixel by pixel the correlation of the low pass filtered video signals for a range of pixel offsets and thereby providing a plurality of gradient vectors for each said pixel;
   means for selecting, for each pixel of said input digital video signal, the gradient vector corresponding to the said correlation which is of maximum value; and
   spatial interpolator means for deriving sample values for creating interpolated scan lines of the input field by combining sample values from the existing scan lines of said input field offset by said gradient vectors corresponding to correlation of maximum value.

12. An interpolator apparatus according to claim 11; wherein said range of pixel offsets used for the correlation of each pixel is defined by a window of aligned pixels centered on the respective pixel.

13. An interpolator apparatus according to claim 12; wherein, in calculating the correlation of said low pass filtered video signals, the latter are multiplied by weighting coefficients of said window which decrease with distance of the respective offset pixels from the center pixel.

14. An interpolator apparatus according to claim 11; wherein said high pass filtering means provides a low weighting function for gradient vectors of large magnitude.

15. An interpolator apparatus according to claim 11; wherein said interpolated scan lines are to be mid-way between adjacent scan lines of said input field so that a progressive scan field is formed, and wherein said horizontal interpolator means is a 2:1 interpolator.

16. An interpolator apparatus according to claim 11; wherein said interpolated scan lines are to be at predetermined positions off-set from mid-way between adjacent scan lines of said input field, and wherein said horizontal interpolator means interpolates in dependence on said off-set of said predetermined positions.

17. An interpolator apparatus according to claim 11; wherein luminance sample values are used as the values for said pixels of said input field.

18. An interpolator apparatus according to claim 11; further comprising:

field store means for storing a field of said interlace scanned video signal, and for supplying a previous field;

motion detector means for determining a local degree of motion in a picture represented by said input field of said interlace scanned video signal on the basis of said input field and said previous field, and for supplying a selector control signal in dependence on the determined local degree of motion; and output selector means controlled by said selector control signal from the motion detector means for supplying, as the output of the interpolator apparatus, the output of said spatial interpolator when said degree of motion is at least at a predetermined threshold, and for supplying, as the output of the interpolator apparatus, the field stored in said field store means when said degree of motion is below said predetermined threshold.

19. An interpolator apparatus for interpolating fields or frames of an input video signal which is constituted by successive pixels arranged in vertical alignment in horizontal scan lines, said interpolator apparatus comprising:

spatial high pass filtering means for horizontally and vertically filtering said fields or frames of said input video signal and thereby forming a spatially high pass filtered video signal;

means defining a plurality of parallel processing channels receiving said spatially high pass filtered video signal and each including spatial low pass filtering means for horizontally and vertically filtering said spatially high pass filtered video signal and thereby forming spatially low pass filtered video signals;

spatial interpolator means for horizontally and vertically interpolating the pixels in said scan lines of each of the fields or frames of said video signal so as to increase the number of samples per scan line and the number of scan lines in each field or frame;

means for calculating pixel by pixel of the spatial low pass filtered video signals the correlation for a range of horizontal and vertical pixel offsets which correspond to respective directional gradient vectors;

means for selecting for each pixel of said video signal the one of said directional gradient vectors corresponding to the correlation which is of maximum value; and interpolator means for deriving interpolated fields or frames by combining existing samples of increased number as obtained from said spatial interpolator means and which are offset by said one directional gradient vector.

20. In a television standards converter for converting an input video signal from one television standard to another, an interpolator apparatus for interpolating fields or frames of said input video signal which is constituted by successive pixels arranged in vertical alignment in horizontal scan lines, said interpolator apparatus comprising:

spatial high pass filtering means for horizontally and vertically filtering said fields or frames of said input video signal and thereby forming a spatially high pass filtered video signal;

means defining a plurality of parallel processing channels receiving said spatially high pass filtered video signal and each including spatial low pass filtering means for horizontally and vertically filtering said spatially high pass filtered video signal and thereby forming spatially low pass filtered video signals;

spatial interpolator means for horizontally and vertically interpolating the pixels in said scan lines of each of the fields or frames of said video signal so as to increase the number of samples per scan line and the number of scan lines in each field or frame;

means for calculating pixel by pixel of the spatial low pass filtered video signals the correlation for a range of horizontal and vertical pixel offsets which correspond to respective directional gradient vectors;

means for selecting for each pixel of said video signal the one of said directional gradient vectors corresponding to the correlation which is of maximum value; and interpolator means for deriving interpolated fields or frames by combining samples of increased number as obtained from said spatial interpolator means and which are offset by said one directional gradient vector.

* * * * *